US00RE47346E

(19) United States
(12) Reissued Patent
Weinholt et al.

(10) Patent Number: US RE47,346 E
(45) Date of Reissued Patent: *Apr. 9, 2019

(54) RADIO SYSTEM

(71) Applicant: Telefonaktiebolaget LM Ericsson (PUBL), Stockholm (SE)

(72) Inventors: Dan Rutger Weinholt, Västra Frölunda (SE); Marcus Karl Hasselblad, Mölndal (SE)

(73) Assignee: TELEFONAKTIEBOLAGET LM ERICSSON (PUBL), Stockholm (SE)

( * ) Notice: This patent is subject to a terminal disclaimer.

(21) Appl. No.: 15/688,573

(22) Filed: Aug. 28, 2017

Related U.S. Patent Documents

Reissue of:
(64) Patent No.: 9,113,420
Issued: Aug. 18, 2015
Appl. No.: 13/519,976
PCT Filed: Dec. 29, 2009
PCT No.: PCT/EP2009/067992
§ 371 (c)(1),
(2) Date: Sep. 14, 2012
PCT Pub. No.: WO2011/079858
PCT Pub. Date: Jul. 7, 2011

U.S. Applications:
(63) Continuation of application No. 15/061,742, filed on Mar. 4, 2016, now Pat. No. Re. 46,530.

(51) Int. Cl.
*H04B 1/00* (2006.01)
*H04B 15/00* (2006.01)
(Continued)

(52) U.S. Cl.
CPC ..... *H04W 52/16* (2013.01); *H04W 52/545* (2013.01)

(58) Field of Classification Search
CPC ... H04W 52/04; H04W 52/06; H04W 52/143; H04W 52/146; H04W 52/16;
(Continued)

(56) References Cited

U.S. PATENT DOCUMENTS 8,843,170 B2 9/2014 Barberis et al.
8,983,519 B2 3/2015 Shibuya
(Continued)

FOREIGN PATENT DOCUMENTS

EP 1548955 A1 6/2005
JP 2005517343 A 6/2005
(Continued)

OTHER PUBLICATIONS

International Search Report and the Written Opinion of the International Searching Authority dated Sep. 23, 2010, in International Application No. PCT/EP2009/067992, 11 pages.
(Continued)

*Primary Examiner* — Minh Dieu Nguyen
(74) *Attorney, Agent, or Firm* — Rothwell, Figg, Ernst & Manbeck, p.c.

(57) ABSTRACT

A radio system (110) comprising a first (120) and a second (130) radio unit which comprise a transmitter (122, 132) and a receiver (121, 131). The first radio unit (120) communicates with a first external radio unit (101) and the second radio unit (140) with a second external radio unit (102). Both transmitters (122, 132) are arranged to vary their output power level in response to a request from the external radio unit with which they are arranged to communicate. Both of the transmitters also vary their output power level in response to a variation in the transmitter output power level of the other radio unit.

25 Claims, 4 Drawing Sheets

(51) Int. Cl.
*H04W 52/16* (2009.01)
*H04W 52/54* (2009.01)

(58) Field of Classification Search
CPC ... H04W 52/18; H04W 52/245; H04W 16/14; H04W 28/04; H04B 1/1027; H04B 1/525; G01S 13/878
USPC ..... 455/63.1, 500, 517, 522
See application file for complete search history.

(56) References Cited

U.S. PATENT DOCUMENTS

| | | | | |
|---|---|---|---|---|
| 2002/0077113 | A1 | 6/2002 | Spaling et al. | |
| 2003/0087661 | A1 | 5/2003 | Qin et al. | |
| 2003/0228877 | A1 | 12/2003 | Haapoja | |
| 2004/0235511 | A1 | 11/2004 | Nakao | |
| 2007/0054619 | A1* | 3/2007 | Kinnunen et al. | 455/63.1 |
| 2010/0029212 | A1* | 2/2010 | Malladi et al. | 455/63.1 |

FOREIGN PATENT DOCUMENTS

| | | | |
|---|---|---|---|
| JP | 2010518723 | A | 5/2010 |
| WO | 2004079975 | A2 | 9/2004 |
| WO | 2008013286 | A1 | 1/2008 |

OTHER PUBLICATIONS

Notification of Reason for Refusal dated Nov. 8, 2013, issued in Japanese patent application No. 2012-546365 with English translation, 4 pages.
Amendment dated Nov. 28, 2013, issued in Japanese patent application No. 2012-546365 (English translation only), 4 pages.

* cited by examiner

RADIO SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*Notice: More than one reissue application has been filed for the reissue of U.S. Pat. No. 9,113,420. The reissue applications are this application and application Ser. No. 15/061,742.* This application is *a continuation reissue of application Ser. No. 15/061,742, which is an application for reissue of U.S. Pat. No. 9,113,420, which is* a 35 U.S.C. §371 National Phase Entry Application from PCT/EP2009/067992, filed Dec. 29, 2009, and designating the United States, the disclosure of which is incorporated herein in its entirety by reference.

TECHNICAL FIELD

The present invention discloses an improved radio system.

BACKGROUND

In radio communications systems such as, for example, those in the microwave frequency range, in particular in so called star shaped systems, i.e. systems with a number of point to point paths to a central node, it is difficult to achieve a sufficient degree of isolation between the different paths so as to reduce the degree of interference between the paths to an acceptable level. One known way of reducing inter-path interference in a star shaped system is to use a large frequency separation between the paths. This is however not desirable, since frequency reuse is highly desirable, i.e. it is desired to use the same frequencies in the system as much as possible.

Another known way of reducing inter-path interference is to use so called "node cancellation", i.e. to let a receiver which has a high degree of interference from adjacent paths include a cancellation circuit which receives information from the receivers of the interfering paths, and which uses this information together with the signal received by the "own" receiver in order to cancel interference, for example by comparing the signal received by the own receiver with the signal or signals received by the receivers of the interfering paths.

SUMMARY

A purpose of the present invention is to enable the design of a radio communications system, in particular a star shaped such system, in which frequency reuse together with node cancellation is enabled.

This purpose is met by the present invention in that it discloses a radio system which comprises at least a first and a second radio unit, both of which comprise a transmitter and a receiver. In the system of the invention, the first radio unit is arranged to communicate with a first external radio unit and the second radio unit is arranged to communicate with a second external radio unit.

According to the invention, the transmitters of both radio units are arranged to vary the output power level of their transmissions in response to a request from the external radio unit with which they are arranged to communicate, and both of the transmitters are also arranged to vary the output power level of their transmissions in response to an variation in the output power level of the transmitter of the other radio unit, so that a requested variation in the output power level of one of the transmitters results in a variation in the output power level of both transmitters.

Thus, by means of the invention, a "common" control of the output power levels of the transmitters is used, which makes it possible to maintain the "power balance" between the different paths, at least in the "transmit direction", as seen from the radio unit. In addition, a power increase in the transmitters will be determined by the path which has the highest need of it.

In one embodiment of the radio system of the invention, a requested variation which is an increase in output power is carried out by both transmitters in equal amounts, which is the requested amount.

In one embodiment of the radio system of the invention, the radio units are arranged to let their transmitter use the larger increase in the case that both of the external radio units request a variation which is an increase during the same time period.

In one embodiment of the radio system of the invention, the first and second radio units are arranged to let their transmitters only carry out a decrease in the power level of their transmissions in response to requests for decrease which are requested by both of the external radio units during the same time period. Naturally, the time period used in this embodiment is a design parameter which can vary within the scope of the invention, but a preferable range for this time period is 10-100 msec. In one such embodiment of the radio system of the invention, the decrease which is carried out by the transmitters of the first and second radio units is the smaller of that requested by the two external radio units, if the requested amounts vary. In another such embodiment of the radio system of the invention, the requested decrease is carried out by the transmitters of both radio units in equal amounts.

In one embodiment of the radio system of the invention, the radio units are arranged to ignore requests for increases or decreases in the output power of their transmitters during a defined period of time following an increase or decrease in their output power. Naturally, the time period used in this embodiment is a design parameter which can vary within the scope of the invention, but a preferable range for this time period is 10-100 msec.

In one embodiment of the radio system of the invention, at least one of the radio units is equipped with a cancellation circuit for cancelling interference from the external radio unit with which the other radio unit in the system is arranged to communicate. The cancellation circuit is arranged to perform its cancelation by means of receiving samples of the signal received by the other radio unit's receiver as well as the signal received by the own radio unit's receiver.

These and other embodiments of the invention will be described in more detail in the following text.

BRIEF DESCRIPTION OF THE DRAWINGS

The invention will be described in more detail in the following, with reference to the appended drawings, in which.

DETAILED DESCRIPTION

Figure 1:
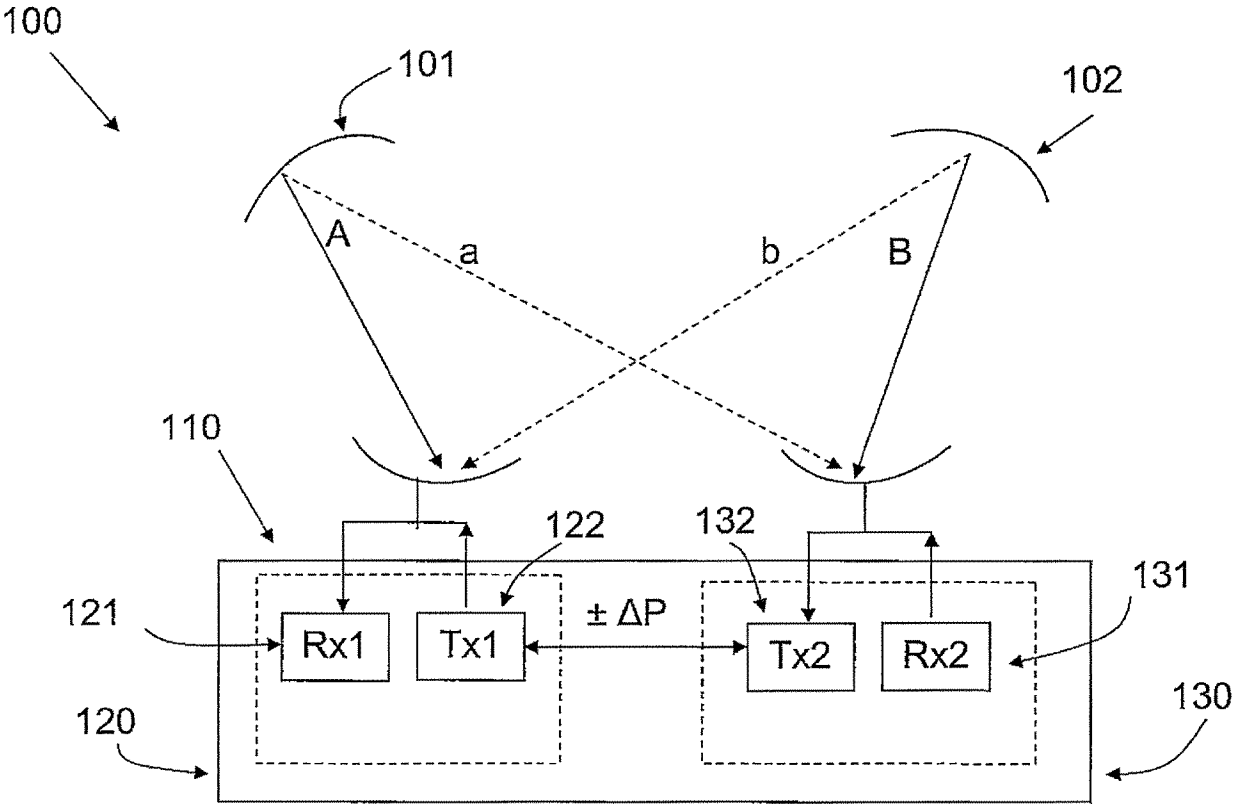
FIG. 1 shows a schematic view of a communications system in which a first embodiment of the radio system of the invention is used.

FIG. 1 shows a schematic view of a system 100 in which a radio system 110 of the invention is used: as shown, a radio system 110 of the invention comprises at least a first 120 and a second 130 radio unit, both of which comprise a receiver 121, 131, and a transmitter 122, 132. Naturally, the number of radio units shown in FIG. 1 as being comprised in the radio system 110 of the invention is an example only, a radio system of the invention can comprise a number of radio units which exceeds two.

As shown in FIG. 1, each of the radio units is arranged to communicate with au external radio unit, shown as 101 and 102 in FIG. 1, where the first radio unit 120 communicates with external radio unit 101, and the second radio unit 130 communicates with external radio unit 102. The verb "communicate" is here used to denote transmissions from the transmitters 122, 132, of the radio units 120, 130 to the external radio units 101, 102, and the reception of transmissions by the receivers 121, 131, of the radio units 120, 130, from the external radio units 101, 102. Symbolically, the first external radio unit 101 is shown as transmitting data labeled as "A" in FIG. 1, and the second external radio unit 102 is shown as transmitting data labeled as "B" in FIG. 1, with the data shown by means of arrows.

As is also indicated in FIG. 1 by means of arrows with dashed lines, there is a certain amount of interference in each of the radio units, i.e. the first radio unit 120 will to some degree receive interfering transmissions "b" from the external radio unit 102, and the second radio unit 130 will to some degree receive interfering "a" transmissions from the external radio unit 101. It is such inter-path interference which it is an aim of the present invention to reduce.

According to the invention, the radio system 110 of the invention comprises a feature which will reduce inter-path interference: as shown in FIG. 1, there is a connection labeled "±ΔP" between the transmitters 122, 132 of the first and second radio units. This connection in FIG. 1 is used to symbolically indicate the presence of the following feature: the transmitters 122, 132, of the two radio units 120, 130, are arranged to vary the output power level of their transmissions in response to a request from the external radio unit with which they are arranged to communicate, and both of the transmitters are also arranged to increase the output power level of their transmissions in response to an increase in the transmitter of the other radio unit. In other words, a requested increase in the output power level of one of the transmitters 122, 132 results in an increase in the output power level of both transmitters 122, 132.

Due to this "linkage" between the transmitters, the power balance between the paths (i.e. the connections between radio unit 120—external radio unit 101 and radio unit 130—external radio unit 102) will be maintained. If, conversely, each radio unit would independently increase its output power level, the "power balance" between the paths would be disturbed, which is not desirable.

As also suggested implicitly by the text above, the external radio units 101, 102, are arranged to signal to the radio unit 120, 130, with which they are in communication if there is a need for an increase in the output power level of the radio unit, due to, for example, path fading. Such signals can for example, be sent over a dedicated control channel, or they can be "interwoven" with other channels.

Figure 2:
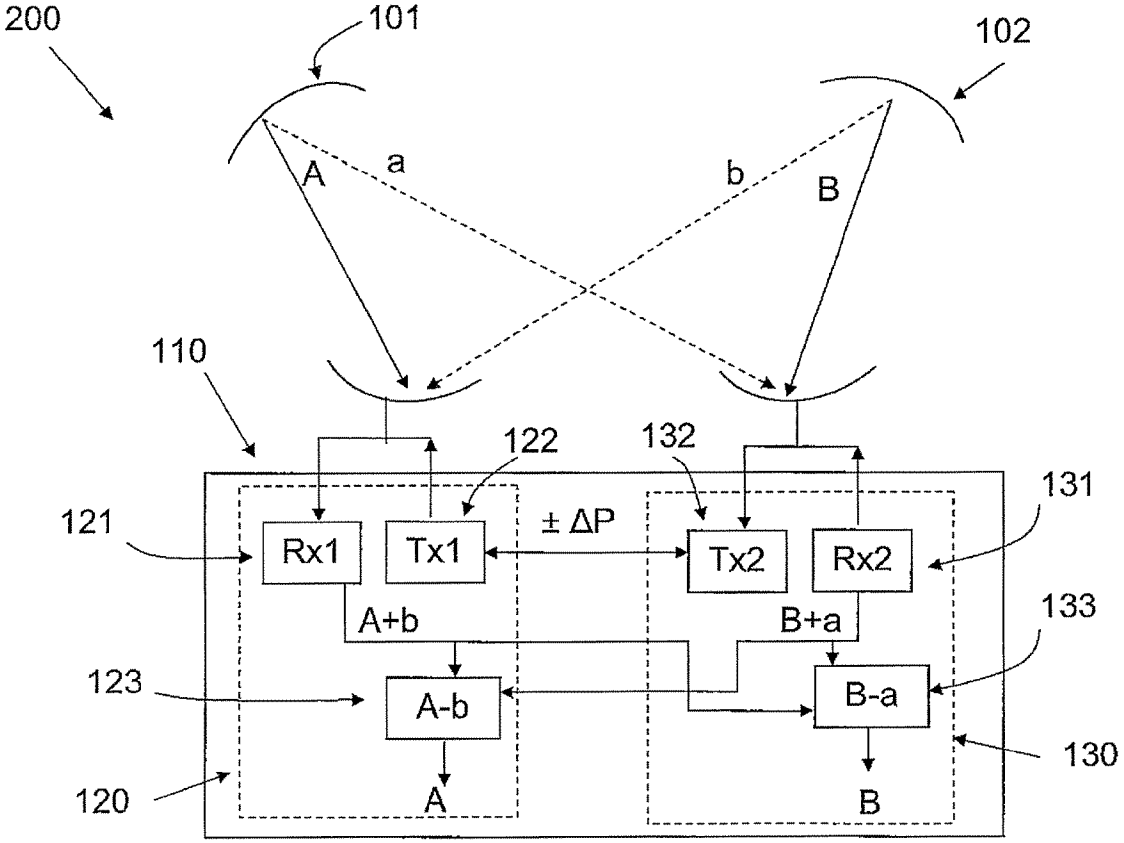
FIG. 2 shows a schematic view of a communications system in which a second embodiment of the radio system of the invention is used.

In a further embodiment 200 of the radio system of the invention, which is shown in FIG. 2 with reference numbers retained from FIG. 1 for corresponding components, at least one, but preferably both, of the radio units 120, 130, comprise a cancellation circuit 123, 133, which functions as follows, as is also indicated in FIG. 2: the cancellation circuit 123 of the first radio unit 120 receives samples of the signal received by the "other" radio unit's receiver, i.e. the receiver 131 in the second radio unit 130, as well as receiving the signal from the "own" radio unit's receiver, in this case thus the receiver 121. Thus, as shown, the first radio unit's cancellation circuit 123 receives the signal symbolically shown as A+b from both the "own" receiver 121 and the receiver 131 of the other radio unit. The same principle is used for the signal received by the first cancellation unit 123 from the second radio unit's receiver 131, with the B dominating in this signal, and a being the interfering signal. In addition, the same principle has been used to show the signals received by the second cancellation unit 133 from the two receivers 121, 131.

The exact function of the cancellation circuit 123 can vary within the scope of the invention as will be realized by those skilled in the art, since such cancellation circuits are well known. However, one example of how the function of the cancellation circuits 123, 133 can be exemplified by means of the first cancellation circuit 123 and the signals it receives:

The signal received from the first receiver 121 is A+b. The signal which it is desired to retain is A, and the signal which is received from the second receiver is multiplied by a factor $k=-b/B$ and then added to A+b, which gives us an output signal from the first cancellation circuit 123 of $A*(1+k)$ if A is here used to symbolize both the signals shown as A and "a" in FIG. 1. The same principle is suitably applied by the second cancellation circuit 133 in order to arrive at a signal of $B*(1+k_1)$, where $k_1=-a/A$. The output signal from the second cancellation circuit 133 is shown as "B" in FIG. 1, since the B signal is the dominant signal here.

Figure 3:
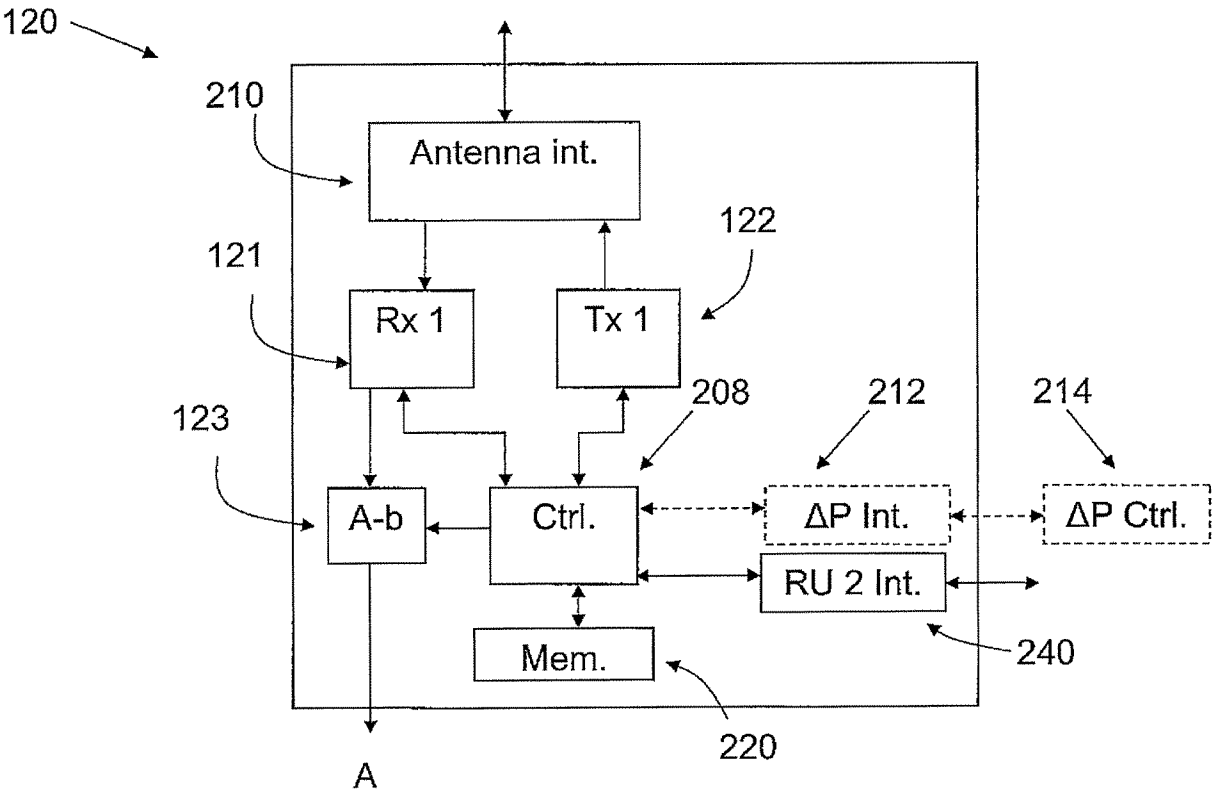
FIG. 3 shows a schematic block diagram of a radio system of the invention.

The function of the radio units 120, 130 of the radio system 200 will be explained further with reference to FIG. 3, which shows a block diagram of an embodiment of the radio unit 120. It should be understood that although only the function of one of the radio units 120 of the radio system 110 of the invention is explained here, the function of the other radio unit 130 is analogous. In FIG. 3, reference numbers from FIGS. 1 and 2 have been maintained for corresponding units. Also, although the description below refers to a radio unit equipped with a cancellation unit, it should be understood that in applicable parts the description below applies to the radio units of FIG. 1 as well.

As shown in FIG. 3, the radio unit 120 comprises an antenna interface 210, which serves to connect the transmitter 122 and receiver [132] *121* of the radio unit 120 to an antenna. As is also shown in FIG. 3, the radio unit 120 comprises a control unit 208, which control the function of, inter alia, the receiver 121 and the transmitter 122. Suitably, but not necessarily, the control unit 208 comprises one or more processors, for example a microprocessor. The radio unit 120 also comprises an interface unit 240, which is the interface towards one or more other radio units, in this case the second radio unit 130, for which reason the interface unit is labeled "RU 2 Int".

It is through the interface unit 240 that the radio unit 120 receives the information described above from the second (or more) radio unit, i.e. the sample of the signals received by the receiver of the second radio unit, as well as requests for increase in the output power level of the transmitter 122 of the second radio unit. In addition, it should be mentioned that the interface unit 240 is "reciprocal", i.e. signals which are received through the interface unit 240 also correspond to signals which are sent to the second radio unit 130 if the radio system 110 is designed so that the second radio unit 130 can utilize such signals.

As shown in FIG. 3, signals to the cancellation circuit 123 and the transmitter 122 are routed through the control circuit 208. This should be seen as a preferred example only, it is naturally within the scope of the invention is to let the signals be routed in other ways as well, for example to connect them straight to their respective destinations, such as for example, the cancellation circuit 123. The function of the cancellation circuit 123 will not be elaborated upon here, since it has been described above.

As also shown in FIG. 3, the radio unit 120 also comprises a memory unit "Mem" 220. The memory unit is used in order to, for example, let the control unit store data and, if applicable, executable program code.

As explained in connection to FIG. 1, the transmitter 122 is arranged to vary the output power level of its transmissions in response to a request from the external radio unit with which it is arranged to communicate, i.e. the external radio unit 101, and it is also arranged to vary its output power level of its transmissions in response to a variation of the output power in the transmitter of the other radio unit, so that a requested increase in the output power level of one of the transmitters results in an increase in the output power level of both transmitters. It is such increases that are suitably controlled by the control unit 208, by means of, inter alia, the information received by the control unit from the interface unit 240, as well as information comprised in signals received by the "own" receiver 121. Also, if the second radio unit 130 is designed to utilize such information, the control unit 208 transmits requests for an increase (and in some embodiments, decrease, as will be described below) to the second radio unit via the interface unit 240.

Regarding the increase in output power level from the transmitters 122, 132, the following principle is suitably adhered to: if one of the radio units receives a request for an output power increase, the request is met by both transmitters in equal amounts, which is also the requested amount.

In the case that both of the external radio units request an increase during one and the same time period, this is suitably handled by letting the transmitters use the larger requested increase, which is suitably handled by the control units of the two radio units. The time period in question is of course a design parameter which can be varied between different systems, but a suitable range for such time periods is 10-100 msec.

As touched upon previously, in some embodiments of the invention, the radio units are also arranged to let their transmitters decrease their output power level in response to requests for this from the external radio units, in the case that a decrease is requested by all (both, in this case) of the external radio units during the same time period. The time period in question is of course a design parameter which can be varied between different systems, but a suitable range for such time periods is 10-100 msec.

In one such embodiment, the decrease which is carried out by the transmitters 122, 132, of the first 120 and second 130 radio units is the smaller of that requested by the two external radio units, if the requested amounts vary. This is in order to ensure that the path which needs the highest power level has its needs met by the radio system.

Suitably, the requested decrease is carried out by the transmitters 122, 132, of both radio units 120, 140 in equal amounts.

In order to avoid "over-regulation", in one embodiment the radio units 120, 130, are arranged to ignore requests for increases or decreases in the output power of their transmitters for a defined period of time following an increase or decrease in their output power level. The time period in question is of course a design parameter which can be varied between different systems, but a suitable range for such time periods is 10-100 msec.

FIG. 3 also shows an alternative configuration of the radio unit 120, indicated by means of dashed lines: as shown, the radio unit 120 can comprise an additional interface unit 212, a "ΔP interface", shown as "ΔP Int." in FIG. 3. This unit 212 interfaces with a power control unit 214 "ΔP Ctrl" which is common to the radio unit 120 and one or more other radio units in a radio system in which the radio unit 120 is comprised. Thus, in the example shown in FIG. 2, the additional interface unit receives commands for variations, i.e. increases and/or decreases in the output power level. The notation "ΔP" is used here for such variations, in order to show that commands from the control units are suitably given as a "delta", i.e. relative to a nominal power level which is suitably set when the radio unit 120 is installed, and which is a value which is also stored, suitably in the radio unit, for example in the memory unit 220.

In an embodiment which uses a common power control unit such as the one shown as "ΔP Ctrl" 214 in FIG. 3, requests for variations in the output power level of the transmitter T×1 are suitably received via the receiver R×1 121 and routed to the common power control unit via the interface 212; commands for variations in the output power level of the transmitter unit 122 are then also received from the common power control unit via the interface 212. Also, if a common power control unit is used, it is suitably this unit which handles the logic involved in setting the values for variations in the output power level of the transmitter T×1, as well as the transmitters of the other radio units comprised in the system of the invention, i.e. in the case shown in FIG. 2 the transmitter 132 of the second radio unit 130.

Figure 4:
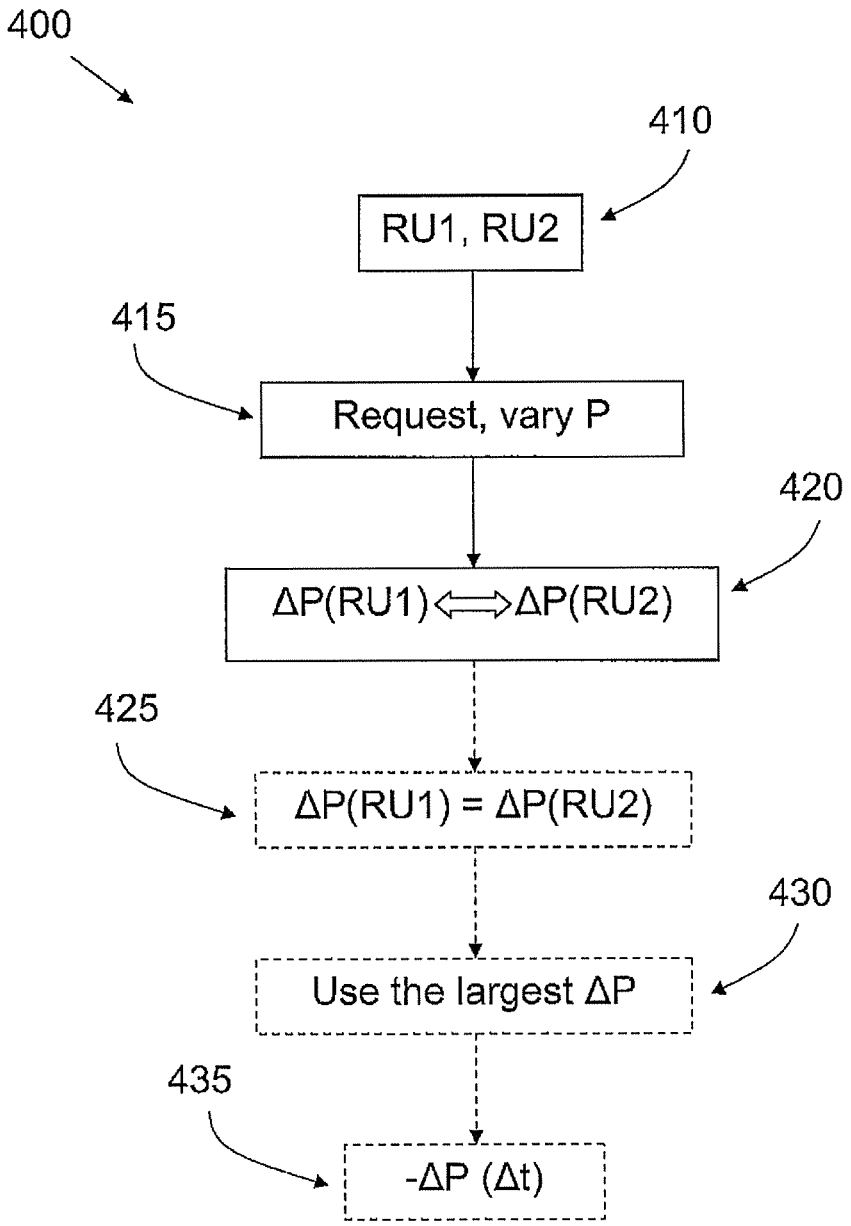
FIG. 4 shows a schematic flow chart of a method of the invention.

FIG. 4 shows a schematic flow chart of a method 400 of the invention. Steps which are options or alternatives are indicated by means of dashed lines and arrows in FIG. 4.

As shown in FIG. 4 and as has also emerged from the description above, the method 400 of the invention is intended for use in a radio system such as the one 110 of FIGS. 1 and 2, and comprises, box 410, the use of at least a first radio unit in order to communicate with a first external radio unit and a second radio unit in order to communicate with a second external radio unit, with both radio units comprising a transmitter and a receiver.

According to the invention, the method 400 comprises letting the transmitters of both of the radio units vary, box 415 the output power level of their transmissions in response to a request from the external radio unit with which they communicate, and also letting both of the transmitters increase, box 420, the output power level of their transmissions in response to an increase in the transmitter of the other radio unit, so that a requested variation in the output power level of one of the transmitters results in a variation in the output power level of both transmitters.

In one embodiment of the method 400, box 425, if the requested variation ΔP is a request for an increase, the requested increase ΔP is carried out by both transmitters in equal amounts, which is the requested amount.

In one embodiment of the method 400, box 430, the radio units let their transmitter use the larger increase ΔP in the case that both of the external radio units request a variation which is an increase during the same time period.

In one embodiment of the method 400, box 435, the transmitters of both the first and second radio units only carry out a decrease −ΔP in the power level of their transmissions in response to requests for decrease which are requested by both of the external radio units during the same time period, shown as Δt in FIG. 4.

In one embodiment of the method 400, the decrease which is carried out by the transmitters of the first and second radio units is the smaller of that requested by the two external radio units, if the requested amounts vary.

In one embodiment of the method 400, a requested decrease is carried out by the transmitters of both radio units in equal amounts.

In one embodiment of the method 400, the radio units ignore requests for increases or decreases in the output power of their transmitters during a defined period of time following an increase or decrease in their output power level.

In one embodiment of the method 400, at least one of the radio units (120, 130) carries out a cancelling operation in order to cancel interference from the external radio unit with which the other radio unit in the system is arranged to communicate, the canceling being performed by means of receiving samples of the signal received by the other radio unit's receiver as well as the signal received by the own radio unit's receiver.

The invention is not limited to the examples of embodiments described above and shown in the drawings, but may be freely varied within the scope of the appended claims.

The invention claimed is:

1. A radio system comprising:

at least a first and a second radio unit, both of which radio units comprise a transmitter and a receiver;

the first radio unit arranged to communicate with a first external radio unit and the second radio unit arranged to communicate with a second external radio unit; *and* [and] the transmitters of both *the first and the second* radio units arranged to vary [the output power level] *respective output power levels* of their transmissions in response to a [request] *communication* from the external radio unit with which they are arranged to communicate, with both of said transmitters also being arranged to vary the [output power level] *respective output power levels* of their transmissions in response to a variation in the output power level of the transmitter of the other *of the first and second* radio unit, so that a [requested] variation in the output power level of one of the transmitters results in a variation in the output power level of both transmitters, wherein [both radio units are arranged to enable their transmitters to use a larger of an increase in a variation in the output power level specified in a request from both of the first and second external radio units, wherein the request includes the variation which is an increase during the same time period] *both of said transmitters also being arranged to vary the respective output power levels of their transmissions such that, when a communication from the first external radio unit would cause a first increase value in output power level at the first radio unit in a time period, and a communication from the second external radio unit would cause a second increase value in output power level at the second radio unit during the time period, both the first and the second radio units use a larger of the first increase value and the second increase value to vary the respective output power levels of their transmissions*.

2. The radio system of claim 1, wherein said first and second radio units are arranged to enable their transmitters to only carry out a decrease in the [power level] *respective output power levels* of their transmissions in response to [requests for] *communications that would cause a* decrease [which are requested] by both of the first and second external radio units during the same time period.

3. The radio system of claim 2, wherein [the decrease which is carried out by the transmitters of the first and second radio units is the smaller of that requested by the first and second external radio units, if the requested amounts vary] *both of said transmitters also being arranged to vary the respective output power levels of their transmissions such that, when the communication from the first external radio unit would cause a first decrease value in output power level at the first radio unit in a time period, and the communication from the second external radio unit would cause a second decrease value in output power level at the second radio unit during the time period, both the first and the second radio units use a smaller of the first decrease value and the second decrease value to vary the respective output power levels of their transmissions*.

4. The radio system of claim 3, wherein [said requested] *the* decrease *in output power level* is [carried out] *used* by the transmitters of both the first and second radio units in equal amounts.

5. The radio system of claim 1, wherein the first and second radio units are arranged to ignore [requests for] *communications that would cause* increases or decreases in the output power of their transmitters during a defined period of time following an increase or decrease in their output power level.

6. The radio system of claim 1, wherein at least one of the first and second radio units is equipped with a cancellation circuit for cancelling interference from the external radio unit with which the other radio unit in the system is arranged to communicate, said cancellation circuit being arranged to perform cancelation by receiving samples of the signals received by the receivers of both the first and second radio units.

7. A method for use in a radio [system ,] *system,* comprising the use of at least a first radio unit in order to communicate with a first external radio unit and a second radio unit in order to communicate with a second external radio unit, both of said radio units comprising a transmitter and a receiver, the method comprising:

enabling the transmitters of both *the first and the second* radio units to vary [the output power level] *respective output power levels* of their transmissions in response to a [request] *communication* from the external radio unit with which they communicate; and enabling both of said transmitters to vary the [output power level] *respective output power levels* of their transmissions in response to a variation in the output power level of the transmitter of the other *of the first and second* radio unit, so that a [requested] variation in the output power level of one of the transmitters results in a variation in the output power level of both transmitters, wherein both [radio units enable their transmitters to use the larger increase in the case that both of the first and second external radio units request a variation which is an increase during the same time period] *of said transmitters also being arranged to vary the respective output power levels of their transmissions such that, when a communication from the first external radio unit would cause a first increase value in output power level at the first radio unit in a time period, and a communication from the second external radio unit would cause a second increase value in output power level at the second radio unit during the time period, both the first and the second radio units use a larger of the first increase value and the second increase value to vary the respective output power levels of their transmissions.*

8. The method of claim 7, wherein the transmitters of both of said first and second radio units only carry out a decrease in the [power level] *respective output power levels* of their transmissions in response to [requests for] *communications that would cause a* decrease [which are requested] by both of the first and second external radio units during the same time period.

9. The method of claim 8, wherein [the decrease which is carried out by the transmitters of the first and second radio units is the smaller of that requested by the first and second external radio units, if the requested amounts vary], *when the communication from the first external radio unit would cause a first decrease value in output power level at the first radio unit in a time period, and the communication from the second external radio unit would cause a second decrease value in output power level at the second radio unit during the time period, both the first and the second radio units use a smaller of the first decrease value and the second decrease value to vary the respective output power levels of their transmissions.*

10. The method of claim 9, wherein [said requested] *the* decrease *in output power level* is [carried out] *used* by the transmitters of both the first and second radio units in equal amounts.

11. The method of claim 7, wherein the radio units ignore [requests for] *communications that would cause* increases or decreases in the *respective* output power *levels* of their transmitters during a defined period of time following an increase or decrease in their output power level.

12. The method of claim 7, wherein at least one of the radio units carries out a cancelling operation in order to cancel interference from the external radio unit with which the other radio unit in the system is arranged to communicate, said canceling being performed by receiving samples of the signals received by the receivers of both the first and second radio units.

13. The [method] *radio system* of claim 1, wherein the first radio unit's output power level depends on the *output* power level [requests of] *caused by a communication from* the second radio unit, and the second radio unit's output power level depends on the *output* power level [requests of] *caused by a communication from* the first radio unit.

14. The [method] *radio system* of claim 1, wherein the variation in the output *power* level of one of the [transmitter] *transmitters* is [a requested] *an* increase.

15. The [method] *radio system* of claim 14, wherein the [requested] increase results in an increase in the output power level of both transmitters.

16. The [method] *radio system* of claim 1, wherein the first radio unit includes a first interface unit which connects an antenna of the first radio unit to the first radio unit's transmitter and receiver, and wherein the second radio unit includes a second interface unit which connects an antenna of the second radio unit to the second radio unit's transmitter and receiver.

17. The [method] *radio system* of claim 16, wherein the first interface unit receives information from the second radio unit that includes samples of signals received by the second radio unit as well as [requests for] *communications that would cause an* increase in the output power level of the transmitter of the second radio unit.

18. The [method] *radio system* of claim 1, wherein the first radio unit includes a first cancellation circuit and the second radio unit includes a second cancellation circuit.

19. The [method] *radio system* of claim 18, wherein the first cancellation circuit receives a signal from the first radio unit and another signal from the second radio unit, wherein a desired output signal of the first cancellation circuit by multiplying the signal received from the second radio unit by a factor "k."

*20. A radio system comprising:*

*at least a first and a second radio unit, both of which radio units comprise a transmitter and a receiver;*

*the first radio unit arranged to communicate with a first external radio unit and the second radio unit arranged to communicate with a second external radio unit; and*

*the transmitters of both the first and the second radio units arranged to vary respective output power levels of their transmissions in response to a communication from the external radio unit with which they are arranged to communicate, with both of said transmitters also being arranged to vary the respective output power levels of their transmissions in response to a variation in the output power level of the transmitter of the other of the first and second radio unit, so that, when a communication from one of the first or the second external radio units would cause a variation in the output power level of the transmitter with which it is arranged to communicate, the variation in the output power level of one of the transmitters results in the variation in the output power level of both transmitters.*

*21. The radio system of claim 20, wherein both of said transmitters are arranged to vary the respective output power levels of their transmissions, so that, when communications from both the first and the second external radio units would cause variations in the respective output power levels of the radio units with which each of the external radio units are arranged to communicate, the variations in the output power levels of both of the transmitters results in a variation in the output power levels of both transmitters that is dependent on one of the variations that comprises a largest increase in the output power level.*

*22. The radio system of claim 20, wherein the variations in the respective output power levels of the radio units comprise variations that are an increase during a same time period.*

*23. A method for use in a radio system, comprising the use of at least a first radio unit in order to communicate with a first external radio unit and a second radio unit in order to communicate with a second external radio unit, both of said radio units comprising a transmitter and a receiver, the method comprising:*

*enabling the transmitters of both the first and the second radio units to vary respective output power levels of their transmissions in response to a communication from the external radio unit with which they communicate; and*

*enabling both of said transmitters to vary the respective output power levels of their transmissions in response to a variation in the output power level of the transmitter of the other of the first and second radio unit, so that when a communication from one of the first or the second external radio units would cause a variation in the output power level of the transmitter with which it is arranged to communicate, the variation in the output power level of one of the transmitters results in the variation in the output power level of both transmitters.*

*24. The method of claim 23, wherein both of said transmitters are arranged to vary the respective output power levels of their transmissions, so that, when communications from both the first and the second external radio units would cause variations in the respective output power levels of the radio units in which each of the external radio units are arranged to communicate, the variations in the output power levels of both of the transmitters results in a variation in the output power levels of both transmitters that is dependent on one of the variations that comprises a largest increase in the output power level.*

*25. The method of claim 23, wherein the variations in the respective output power levels of the radio units comprise variations that are an increase during a same time period.*

* * * * *